(12) United States Patent
Dong et al.

(10) Patent No.: US 11,789,287 B2
(45) Date of Patent: Oct. 17, 2023

(54) DISPLAY SYSTEM BASED ON FOUR-DIMENSIONAL LIGHT FIELD, AND DISPLAY METHOD THEREFOR

(71) Applicants: Beijing BOE Optoelectronics Technology Co., Ltd., Beijing (CN); BOE Technology Group Co., Ltd., Beijing (CN)

(72) Inventors: Ruijun Dong, Beijing (CN); Hao Zhang, Beijing (CN); Chenru Wang, Beijing (CN); Ke Li, Beijing (CN); Yulong Wu, Beijing (CN); Jiarong Bai, Beijing (CN); Na Han, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/920,334

(22) PCT Filed: May 25, 2021

(86) PCT No.: PCT/CN2021/095782
§ 371 (c)(1),
(2) Date: Oct. 20, 2022

(87) PCT Pub. No.: WO2021/258960
PCT Pub. Date: Dec. 30, 2021

(65) Prior Publication Data
US 2023/0161173 A1    May 25, 2023

(30) Foreign Application Priority Data
Jun. 23, 2020    (CN) .......................... 202010584644.5

(51) Int. Cl.
G02B 27/01    (2006.01)
G02B 30/10    (2020.01)
(Continued)

(52) U.S. Cl.
CPC ........... *G02B 30/10* (2020.01); *G02B 6/0056* (2013.01); *G02B 27/0101* (2013.01);
(Continued)

(58) Field of Classification Search
CPC ...... G02B 6/0056; G02B 6/124; G02B 6/126; G02B 27/01; G02B 27/0101;
(Continued)

(56) References Cited

U.S. PATENT DOCUMENTS 8,933,862 B2   1/2015  Lapstun
9,310,559 B2   4/2016  Macnamara
(Continued)

FOREIGN PATENT DOCUMENTS

CN    1495520 A    5/2004
CN    101414425 A    4/2009
(Continued)

OTHER PUBLICATIONS

Xinxing Xia. "Principle and Establishment of Horizontal Light Field Three-dimensional Displays." A doctoral thesis. Zhejiang University. Jun. 2014.
(Continued)

*Primary Examiner* — Nitin Patel
*Assistant Examiner* — Cory A Almeida
(74) *Attorney, Agent, or Firm* — IPRO, PLLC

(57) ABSTRACT

A display system based on a four-dimensional light field, and a display method therefor. The display system includes: a light source module (11), a display panel (12), and a light conduction component (13), wherein the light source module (11) includes a plurality of light sources arranged in an
(Continued)

array; and the display panel (12) is a reflective liquid crystal display panel, and the display panel (12) includes a plurality of pixel units arranged in an array. Light emitted by the light sources in the light source module (11) irradiates the pixel units in the display panel (12); and the pixel units in the display panel (12) transmit the received light to a target position by means of the light conduction component (13).

11 Claims, 3 Drawing Sheets

(51) Int. Cl.
*F21V 8/00* (2006.01)
*G09G 3/34* (2006.01)
*G09G 3/36* (2006.01)

(52) U.S. Cl.
CPC ......... *G02B 27/0172* (2013.01); *G09G 3/342* (2013.01); *G09G 3/36* (2013.01); *G02B 2027/0134* (2013.01); *G09G 2320/0209* (2013.01); *G09G 2320/0646* (2013.01); *G09G 2380/10* (2013.01)

(58) Field of Classification Search
CPC  G02B 27/017; G02B 27/0172; G02B 27/286; G02B 30/10; G02B 2027/0134; G02F 1/133524; G02F 1/1335; G09G 3/342; G09G 3/36; G09G 2320/0209; G09G 2320/0646; G09G 2380/10
See application file for complete search history.

(56) References Cited

U.S. PATENT DOCUMENTS

| | | | |
|---|---|---|---|
| 9,523,852 | B1 | 12/2016 | Brown et al. |
| 10,277,885 | B1 | 4/2019 | Jannard et al. |
| 2011/0051091 | A1 | 3/2011 | Song et al. |
| 2012/0140131 | A1 | 6/2012 | Lanman et al. |
| 2016/0349508 | A1 | 12/2016 | Horikawa |
| 2017/0003507 | A1 | 1/2017 | Raval et al. |
| 2018/0188691 | A1 | 7/2018 | Fattal |
| 2019/0250456 | A1* | 8/2019 | Lo ................... G02B 30/10 |
| 2020/0174252 | A1* | 6/2020 | Lamkin ............ G06F 3/013 |
| 2021/0026069 | A1 | 1/2021 | Baets et al. |
| 2021/0149199 | A1 | 5/2021 | Guan et al. |
| 2021/0223452 | A1 | 7/2021 | Zhou |
| 2021/0227198 | A1 | 7/2021 | Zhang et al. |

FOREIGN PATENT DOCUMENTS

| | | | |
|---|---|---|---|
| CN | 103837988 | A | 6/2014 |
| CN | 104049451 | A | 9/2014 |
| CN | 104156916 | A | 11/2014 |
| CN | 104777615 | A | 7/2015 |
| CN | 105158917 | A | 12/2015 |
| CN | 105700145 | A | 6/2016 |
| CN | 105929595 | A | 9/2016 |
| CN | 205787364 | U | 12/2016 |
| CN | 205880368 | U | 1/2017 |
| CN | 107367845 | A | 11/2017 |
| CN | 107483910 | A | 12/2017 |
| CN | 107817556 | A | 3/2018 |
| CN | 107908013 | A | 4/2018 |
| CN | 107942513 | A | 4/2018 |
| CN | 108008540 | A | 5/2018 |
| CN | 108093237 | A | 5/2018 |
| CN | 108351468 | A | 7/2018 |
| CN | 109065600 | A | 12/2018 |
| CN | 109116556 | A | 1/2019 |
| CN | 110133859 | A | 8/2019 |
| CN | 110520784 | A | 11/2019 |
| CN | 111080774 | A | 4/2020 |
| CN | 111610634 | A | 9/2020 |
| JP | 2004184491 | A | 7/2004 |
| JP | 2005208567 | A | 8/2005 |
| WO | 2002073289 | A1 | 9/2002 |
| WO | 2011066275 | A2 | 6/2011 |
| WO | 2015128913 | A1 | 9/2015 |
| WO | 2017058322 | A2 | 4/2017 |
| WO | 2019041812 | A1 | 3/2019 |
| WO | 2020084447 | A1 | 4/2020 |

OTHER PUBLICATIONS

Surman, Phil, et al. "Glasses-free 3-D and augmented reality display advances: from theory to implementation." IEEE MultiMedia 27.1 (2019): 17-26.
Yanan Feng, et al. "4D light field based on Mental Ray light rendering." Highlights of Sciencepaper Online. vol. 9, No. 22. Nov. 2016.
CN202010584644.5 first office action.
PCT/CN2021/095782 international search report.

* cited by examiner according to a positional relationship among a to-be-displayed image, the light source module, the display panel and the target position as well as the original image information of the to-be-displayed image, determining the light emission information of the light sources in the light source module and the display information of the pixel units in the display panel — S201 controlling the light sources in the light source module to emit light according to the light emission information of the light sources in the light source module, and controlling the pixel units in the display panel to display according to the display information of the pixel units in the display panel — S202

Fig. 5

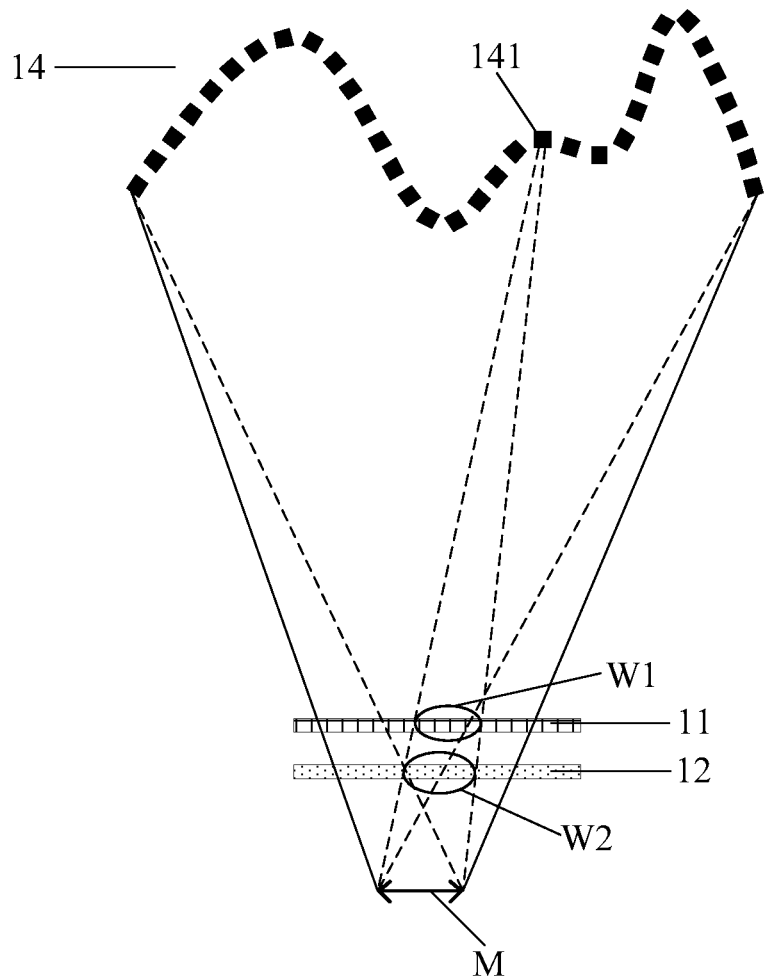

Fig. 6

DISPLAY SYSTEM BASED ON FOUR-DIMENSIONAL LIGHT FIELD, AND DISPLAY METHOD THEREFOR

CROSS REFERENCE TO RELATED APPLICATIONS

The present disclosure claims priority to the Chinese Patent Application No. 202010584644.5, filed to China National Intellectual Property Administration on Jun. 23, 2020, and entitled "DISPLAY SYSTEM BASED ON FOUR-DIMENSIONAL LIGHT FIELD, AND DISPLAY METHOD THEREFOR", the entire content of which is incorporated herein by reference.

FIELD

The present disclosure relates to the technical field of display, in particular to a display system based on a four-dimensional light field, and a display method therefor.

BACKGROUND

With continuous development of display technology, display systems including augmented reality (AR), virtual reality (VR) and head up display (HUD) systems have been widely applied. However, an existing display system fails to realize high-resolution light field imaging.

SUMMARY

Embodiments of the present disclosure provide a display system based on a four-dimensional light field, including:
a light source module, including a plurality of light sources arranged in an array;
a display panel, wherein the display panel is a reflective liquid crystal display panel and includes a plurality of pixel units arranged in an array; and
a light conduction component; wherein light rays emitted by the light sources in the light source module irradiate the pixel units in the display panel, and the pixel units in the display panel transmit the light rays to a target position by means of the light conduction component.

In a possible implementation, in the above display system provided by the embodiments of the present disclosure, the light conduction component includes: an optical waveguiding structure, an adhesive layer, and a light extraction structure;
the optical waveguiding structure includes: a light-emitting face, a back face opposite to the light-emitting face, and a side face; and the optical waveguiding structure is configured to achieve total reflection transmission of light rays at a set angle;
the light source module is arranged on the side face of the optical waveguiding structure; and an included angle is formed between the light source module and the optical waveguiding structure so that the light rays emitted by the light sources irradiate the optical waveguiding structure and are transmitted in a total-reflection mode in the optical waveguiding structure;
the display panel is fixed to the back face of the optical waveguiding structure through the adhesive layer, a refractive index of the adhesive layer is smaller than or equal to a refractive index of the optical waveguiding structure, and the refractive index of the adhesive layer is larger than a refractive index of air; and
the light extraction structure is arranged on the light-emitting face of the optical waveguiding structure and is configured to extract the light rays transmitted in the total-reflection mode in the optical waveguiding structure to the target position.

In a possible implementation, in the above display system provided by the embodiments of the present disclosure, the light extraction structure is a transmission grating.

In a possible implementation, in the above display system provided by the embodiments of the present disclosure, the light conduction component includes: a polarizing element, a polarization reflection layer, a first quarter-wave phase retarder, a second quarter-wave phase retarder, and a semi-transmitting and semi-reflecting layer;
the light source module is arranged opposite to the display panel, the polarization reflection layer is arranged between the light source module and the display panel, an included angle is formed between the polarization reflection layer and the display panel, and the polarization reflection layer is configured to transmit first polarized light and reflect second polarized light;
the polarizing element is arranged between the light source module and the polarization reflection layer and is configured to convert the light rays emitted by the light sources into the first polarized light; the first quarter-wave phase retarder is arranged between the display panel and the polarization reflection layer; the semi-transmitting and semi-reflecting layer is arranged on a side of the polarization reflection layer facing away from the target position; and the second quarter-wave phase retarder is arranged between the semi-transmitting and semi-reflecting layer and the polarization reflection layer.

In a possible implementation, in the above display system provided by the embodiments of the present disclosure, the first polarized light is P-type polarized light, and the second polarized light is S-type polarized light; the polarizing element is a P-type polarizer and is configured to convert the light rays emitted by the light sources into the P-type polarized light; and the polarization reflection layer is configured to transmit the P-type polarized light and reflect the S-type polarized light.

In a possible implementation, in the above display system provided by the embodiments of the present disclosure, a surface of the semi-transmitting and semi-reflecting layer is a curved face.

In a possible implementation, in the above display system provided by the embodiments of the present disclosure, the light conduction component includes: a semi-transmitting and semi-reflecting layer; the semi-transmitting and semi-reflecting layer is configured to reflect light rays emitted by the display panel to the target position.

The embodiments of the present disclosure further provide a display method of the above display system, including:
determining, according to a positional relationship among a to-be-displayed image, a light source module, a display panel and a target position as well as original image information of the to-be-displayed image, light emission information of light sources in the light source module and display information of pixel units in the display panel; and
controlling the light sources in the light source module to emit light according to the determined light emission information of the light sources in the light source module, and controlling the pixel units in the display panel to display according to the display information of the pixel units in the display panel.

In a possible implementation, in the above display method provided by the embodiments of the present disclosure, the determining, according to the positional relationship among the to-be-displayed image, the light source module, the display panel and the target position as well as the original image information of the to-be-displayed image, the light emission information of the light sources in the light source module and the display information of the pixel units in the display panel includes:

- obtaining a plurality of image blocks by differential processing to-be-displayed image; wherein each of the image blocks corresponds to one image point at the target position;
- determining, for the each of the image blocks, all light rays which are from the each of the image blocks to a corresponding image point;
- determining, for each image point, an intersection point between each light ray and the display panel and an intersection point between the each light ray and the light source module, and obtaining four-dimensional coordinate values corresponding to the each light ray; the four-dimensional coordinate values include coordinate values of the intersection point between the each light ray and the display panel and coordinate values of the intersection point between the each light ray and the light source module; and
- determining, according to the original image information of the to-be-displayed image and the four-dimensional coordinate values corresponding to the each image point, the display information of the pixel units in the display panel and brightness information of the light sources in the light source module.

In a possible implementation, in the above display method provided by the embodiments of the present disclosure, the determining, according to the original image information of the to-be-displayed image and the four-dimensional coordinate values corresponding to the each image point, the display information of the pixel units in the display panel and the brightness information of the light sources in the light source module includes:

- taking the four-dimensional coordinate values corresponding to the each image point as a coordinate set; and
  - if a same four-dimensional coordinate values exist in two coordinate set, abandoning the display information and the brightness information determined based on the four-dimensional coordinate values.

BRIEF DESCRIPTION OF THE DRAWINGS

FIG. 5 is a flow chart of a display method of the above display system provided by an embodiment of the present disclosure.

FIG. 6 is a schematic structural diagram corresponding to a display method in an embodiment of the present disclosure.

DETAILED DESCRIPTION OF THE EMBODIMENTS

Figure 1:
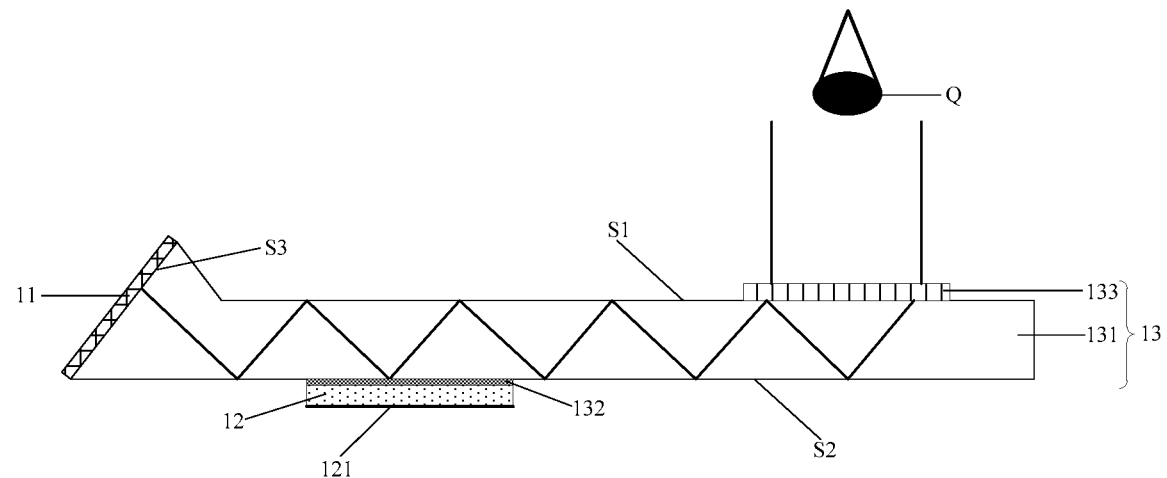
FIG. 1 is a schematic structural diagram of a display system provided by an embodiment of the present disclosure.

Based on a problem that an existing display system in the related art fails to realize high-resolution light-field imaging, embodiments of the present disclosure provide a display system based on a four-dimensional light field and a display method therefor.

Specific implementations of the display system based on the four-dimensional light field and the display method therefor provided by the embodiments of the present disclosure will be described in detail below in combination with the accompanying drawings. Dimensions and shapes of all parts in the drawings do not reflect a true scale, but are merely to illustrate content of the present disclosure.

Figure 2:
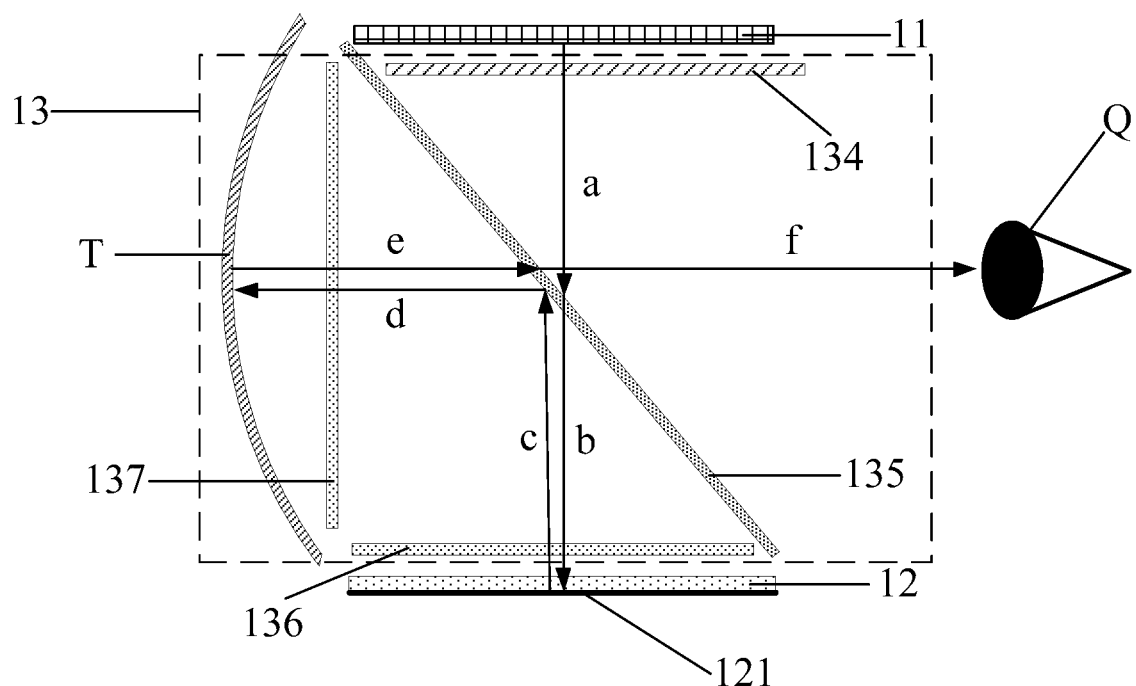
FIG. 2 is another schematic structural diagram of a display system provided by an embodiment of the present disclosure.
Figure 3:
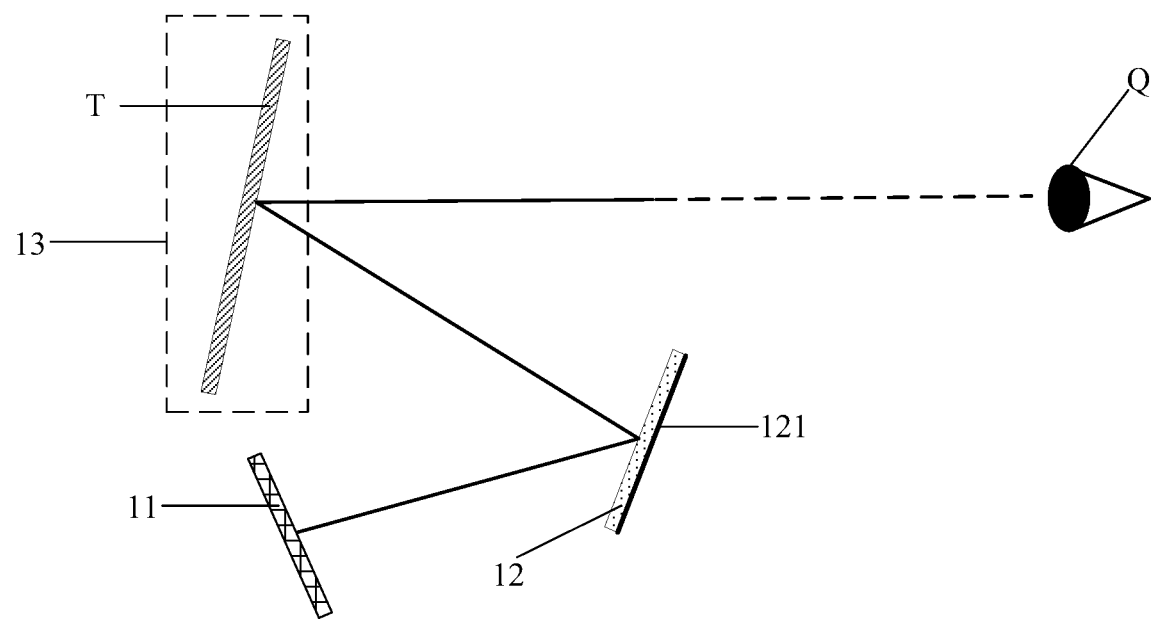
FIG. 3 is another schematic structural diagram of a display system provided by an embodiment of the present disclosure.

The embodiments of the present disclosure provide a display system based on a four-dimensional light field. As shown in FIG. 1 to FIG. 3, the display system includes: a light source module 11, a display panel 12, and a light conduction component 13.

The light source module 11 includes a plurality of light sources arranged in an array (not shown in the drawings).

The display panel 12 is a reflective liquid crystal display panel, and the display panel 12 includes a plurality of pixel units arranged in an array (not shown in the drawings).

Light rays emitted by the light sources in the light source module 11 irradiate the pixel units in the display panel 12, and the pixel units in the display panel 12 transmit the light rays received from the light source module 11 to a target position Q via the light conduction component 13.

In the above display system provided by the embodiments of the present disclosure, through the light source module and the reflective liquid crystal display panel, one light ray may be determined based on one light source in the light source module and one pixel unit in the display panel, and since a location of the light source in the light source module and a location of the pixel unit in the display panel have been determined, four-dimensional parameters of the light ray may be determined, so that four-dimensional light field display may be realized. In addition, because one light source may support multi-image-point imaging and one pixel unit may support multi-image-point imaging, the display system can easily realize high-resolution light-field imaging. For example, if the light source module includes at least 1,000 light sources and a resolution ratio of the display panel is higher than 2k, high-resolution light-field imaging may be achieved.

During specific implementation, the light sources in the above light source module 11 may be light emitting diodes, for example, micro light emitting diodes (Micro LEDs) or light emitting diodes of other specifications, which is not limited here.

The above display panel 12 is a reflective liquid crystal display panel. Unlike a transmission-type liquid crystal display panel, a reflective layer 121 is arranged on a side of the display panel 12 facing away from a display face. After the light rays emitted by the light sources in the light source module 11 irradiate the display panel 12, the light rays are reflected by the reflective layer 121 and then emitted from the display face of the display panel 12, so intensity of the light rays emitted by the pixel units may be controlled by controlling deflection degrees of liquid crystal molecules in the pixel units in the display panel 12, so as to realize grayscale display. In addition, the light source module 11 may be set to include light sources of various colors so as to realize color display; or, the light sources in the light source module 11 are white light sources and color display is realized by setting a color film layer in the display panel 12.

In the embodiments of the present disclosure, light rays in the light field may be precisely controlled through the light source module 11 and the display panel 12, thereby achieving a four-dimensional display light field. Furthermore, through the light conduction component 13, the light rays may be conducted to the target position Q.

During specific implementation, the target position Q may be understood as a position of a light outlet of the display system. In practical application, eyes may see an image displayed by the display panel through the light outlet of the display system.

In order to demonstrate that the display system provided by the embodiments of the present disclosure may realize four-dimensional light field display, the light field of the display system in the embodiments of the present disclosure will be described below in combination with a plenoptic function.

The plenoptic function is a function composed of factors that may determine a presenting form of light rays in a space, and may be represented as: p=f (brightness, spectrum, space, time, depth, polarization), which contains intensity information, wavelength information, spatial location information, time information, depth information, direction information, etc. Different kinds of information in the plenoptic function determine different orientations of research. For example, a grayscale image is fixed by the wavelength information, and if there is a plurality of pieces of wavelength information, an orientation of research is color images or spectral images; if the time information is changing, the orientation of research is videos; if the depth information is considered, the orientation of research is depth imaging which involves a somatosensory factor; if a brightness range is changing, the orientation of research is high-dynamic images; and if direction information is considered, the orientation of research is light field cameras.

Specifically, the plenoptic function may be represented as: $P=P(x, y, z, \theta, \varphi, \lambda, t)$, where x, y, z represent the spatial location information, $\theta$ and $\varphi$ represent angle information, $\lambda$ represents the wavelength information, and t represents the time information.

Because there are trillions of light rays in the space, the plenoptic function contains multiple information, and a data volume is usually excessively large in practical application, the plenoptic function may be subjected to dimensionality reduction. Specifically, for a certain light ray, the wavelength information $\lambda$ is known; and if the light field is a static field at the moment, seven dimensions of the plenoptic function may be reduced to five dimensions: $P=P(x, y, z, \theta, \varphi)$.

In the embodiments of the present disclosure, the light rays in the light field are determined by the locations of the light sources and the pixel units. Therefore, a location and direction of a light ray may be characterized merely according to coordinates of intersection points of the light ray across the light source module and the display panel. Therefore, in the embodiments of the present disclosure, the plenoptic function may be subjected to further dimensionality reduction, and the plenoptic function after dimensionality reduction involves four dimensions, as follows:

$$P=P(s, t, u, v);$$

where (s,t) is the coordinate of the intersection point between the light ray and the light source module, and (u,v) is the coordinate of the intersection point between the light ray and the display panel. In the embodiments of the present disclosure, the plenoptic function is reduced to a four-dimension function, so the data volume may be reduced to a great extent.

Figure 4:
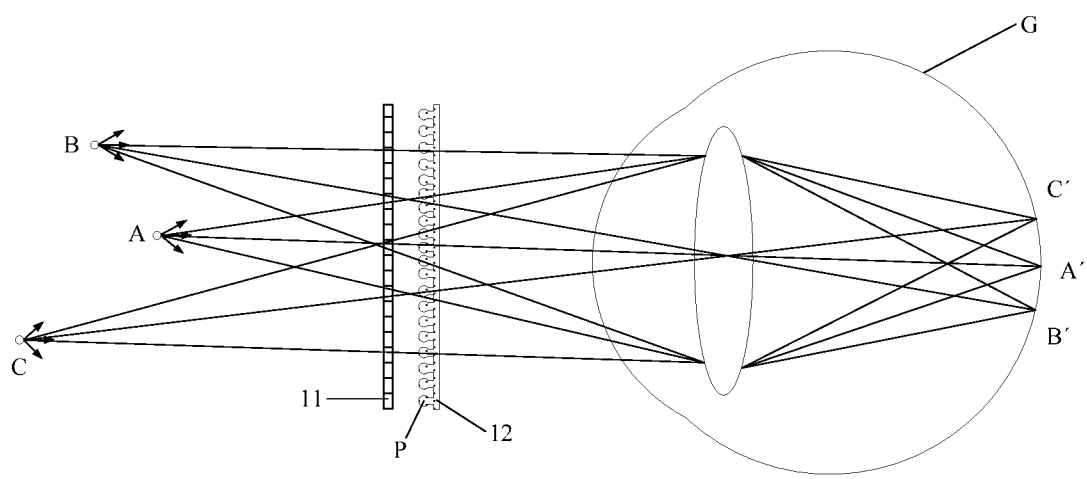
FIG. 4 is a simplified schematic structural diagram of a display system provided by an embodiment of the present disclosure.

FIG. 4 is a simplified schematic structural diagram of a display system provided by the embodiments of the present disclosure. As shown in FIG. 4, the light rays emitted by the light sources in the light source module 11 irradiate a pixel unit P in the display panel 12, the light rays received by the pixel unit P are emitted to an eye G, and the light rays are emitted to a retina through a crystalline lens in the eye G to form an image. FIG. 4 takes three points A, B and C in the to-be-displayed image in the drawing as an example, illustrating the image-forming principle of the to-be-displayed image, and the three points A, B and C in the to-be-displayed image form image points A', B' and C' in the retina of the eye G through the light source module 11 and the display panel 12.

The display system in the embodiments of the present disclosure may include a plurality of implementations, so the display system in the embodiments of the present disclosure may be applied to a plurality of scenes. The implementations of the display system in the embodiment of the present disclosure will be described in detail below in combination with the drawings.

Implementation 1.

In the above display system provided by the embodiments of the present disclosure, as shown in FIG. 1, the above light conduction component 13 includes: an optical waveguiding structure 131, an adhesive layer 132 and a light extraction structure 133.

The optical waveguiding structure 131 includes: a light-emitting face S1, a back face S2 opposite to the light-emitting face S1, and a side face S3. The optical waveguiding structure 131 is configured to achieve total reflection transmission of light rays at a set angle.

The light source module 11 is arranged on the side face S3 of the optical waveguiding structure 131. An included angle is formed between the light source module 11 and the optical waveguiding structure 131 to enable the light rays emitted by the light sources to irradiate the optical waveguiding structure 131 and to be transmitted in a total-refection mode in the optical waveguiding structure 131.

The display panel 12 is fixed to the back face S2 of the optical waveguiding structure 131 through the adhesive layer 132, a refractive index of the adhesive layer 132 is smaller than or equal to a refractive index of the optical waveguiding structure 131, and the refractive index of the adhesive layer 132 is larger than a refractive index of air.

The light extraction structure 133 is arranged on the light-emitting face S1 of the optical waveguiding structure 131 and is configured to extract the light rays transmitted in the total-reflection mode in the optical waveguiding structure 131 to the target position Q.

In the embodiments of the present disclosure, an included angle is formed between the light source module 11 and the optical waveguiding structure 131, and the included angle may enable the light rays emitted by the light sources to be transmitted in the total-reflection mode in the optical waveguiding structure 131. That is, when a light ray emitted by the light sources is transmitted inside the optical waveguiding structure 131, an incident angle of the light ray irradiating the light-emitting face S1 (or the back face S2) is larger than a total reflection critical angle. Specifically, the light source module 11 may be coupled to the optical waveguiding structure 131 through optical clear adhesive.

Furthermore, in order to achieve total reflection of the light rays at the set angle, the refractive index of the optical waveguiding structure 131 is larger than a refractive index of a surrounding medium, i.e. the refractive index of the optical waveguiding structure 131 is larger than the refractive index of air.

The display panel 12 may be fixed to the back face S2 of the optical waveguiding structure 131 through the adhesive layer 132. In order to destroy total reflection of the light rays at the display panel 12 and ensure that the light rays emitted by the light source module 11 can irradiate the display panel 12 to form an image, a refractive index of the adhesive layer 132 needs to be set to be larger than the refractive index of air and smaller than or equal to the refractive index of the optical waveguiding structure 131. During specific implementation, the refractive index of the adhesive layer 132 may be set to be equal to or slightly smaller than the refractive index of the optical waveguiding structure 131.

In a display process, the light rays emitted by the light sources in the light source module 11 irradiate the optical waveguiding structure 131 and are transmitted in the total-reflection mode in the optical waveguiding structure 131; when the light rays irradiate a position of the display panel, the light rays irradiate inside the display panel 12 through the adhesive layer 132 for imaging, the light rays are reflected by the reflective layer 121 and then irradiate into the optical waveguiding structure 131; and the light rays are further transmitted in the total-reflection mode in the optical waveguiding structure 131 until they are transmitted to the location of the light extraction structure 133 to be extracted, and then the light rays irradiate the target position Q. The target position Q usually corresponds to a location of the eyes so that the eyes can see a displayed image of the display panel 12.

In the embodiments of the present disclosure, the light rays are subjected to total reflection transmission through the optical waveguiding structure 131, and the light rays can be transmitted in a loss-free manner. In a transmission process of the light rays, the optical waveguiding structure 131 does not exert any influence on an image formed by the display panel 12. For example, no scaling effect is realized on the image. In addition, the optical waveguiding structure 131 has the advantages of being light and high in penetrability of external light, so the optical waveguiding structure 131 is suitable for mass production.

The display system in the above implementation 1 may be applied to a near-to-eye display apparatus, for example, an augmented reality apparatus. Because the optical waveguiding structure is used to transmit the light rays, the display panel or other imaging element may be arranged at a location away from the eyes, for example, a location corresponding to a forehead or side faces of the eyes, so that the display system may be prevented from blocking external sight; and a weight of the display system may be set to be in better compliance with ergonomic principles, so as to improve a wearing experience of the display system.

Specifically, in the above display system provided by the embodiment of the present disclosure, the above light extraction structure 133 may be a transmission grating. By setting optical parameters of the transmission grating, the light ray in the optical waveguiding structure 131 may be extracted. In addition, the light extraction structure 133 may be other optical elements, which is not limited here.

Implementation 2.

In the above display system provided by the embodiments of the present disclosure, as shown in FIG. 2, the above light conduction component 13 includes: a polarizing element 134, a polarization reflection layer 135, a first quarter-wave phase retarder 136, a second quarter-wave phase retarder 137, and a semi-transmitting and semi-reflecting layer T.

The light source module 11 is arranged opposite to the display panel 12, the polarization reflection layer 135 is arranged between the light source module 11 and the display panel 12, an included angle is formed between the polarization reflection layer 135 and the display panel 12, and the polarization reflection layer 135 is configured to transmit first polarized light and reflect second polarized light.

The polarizing element 134 is arranged between the light source module 11 and the polarization reflection layer 135 and is configured to convert the light rays emitted by the light sources into the first polarized light.

The first quarter-wave phase retarder 136 is arranged between the display panel 12 and the polarization reflection layer 135.

The semi-transmitting and semi-reflecting layer T is arranged on a side of the polarization reflection layer 135 facing away from the target position Q.

The second quarter-wave phase retarder 136 is arranged between the semi-transmitting and semi-reflecting layer T and the polarization reflection layer 135.

In the implementation 2 of the embodiments of the present disclosure, the optical elements in the display system constitute a coaxial refractive and reflective optical system which may ensure high image quality, and a structure is hollow and impact, so that the display system is relatively light and thin. In addition, the coaxial refractive and reflective optical system can realize a relatively large viewing angle, for example, about 50°; and if a volume allows, the viewing angle may be from 80° to 90° or so. In addition, the display system does not adopt any high-end optical element with a curved face, so that a processing difficulty is relatively low and a production cost is low.

As shown in FIG. 2, the light source module 11 is arranged opposite to the display panel 12, so that the situation that the light source module 11 and the display panel 12 block the eyes at the target position Q may be prevented; and other light-transmitting elements may be arranged between the light source module 11 and the display panel 12, thereby achieving a more compact display system.

With reference to FIG. 2, after a light ray a emitted by the light sources in the light source module 11 penetrates through the polarizing element 134, the light ray a is converted into the first polarized light; because the polarization reflection layer 135 may transmit the first polarized light, the light ray a may penetrate through the polarization reflection layer 135 to achieve a light ray b; after the light ray b penetrates through the first quarter-wave phase retarder 136, the light ray b is reflected by the reflective layer 121 in the display panel 12 to obtain a light ray c; and the light ray c penetrates though the first quarter-wave phase retarder 136 again to be converted into the second polarized light, so a polarization status will change because the polarized light penetrates through the quarter-wave phase retarder twice. Because the polarization reflection layer 135 may reflect the second polarized light, the light ray c is reflected by the polarization reflection layer 135 to obtain a light ray d; the light ray d penetrates through the second quarter-wave phase retarder 137, the light ray d is reflected by the semi-transmitting and semi-reflecting layer T to achieve a light ray e; the light ray e penetrates through the second quarter-wave phase retarder 137 again to be converted into the first polarized light, so the light ray e may penetrate through the polarization reflection layer 135 to achieve a light ray f, and the light ray f irradiates the target position Q, so that the eyes may see the displayed image of the display panel at the target position Q.

According to the display system in the implementation 2, through the polarizing element 134, the polarization reflection layer 135, the first quarter-wave phase retarder 136, the second quarter-wave phase retarder 137, and the semi-transmitting and semi-reflecting layer T, light path folding is realized, so a structure is more compact. In addition, in a display process, no stray light irradiates the target position Q, so a display effect is improved. During specific implementation, the display system may be applied to near-to-eye display apparatuses such as an augmented reality apparatus.

Specifically, in the above display system provided by the embodiments of the present disclosure, the above first polarized light is P-type polarized light, and the second polarized light is S-type polarized light; the polarizing element 134 is a P-type polarizer and is configured to convert the light rays emitted by the light sources into the P-type polarized light; and the polarization reflection layer 135 is configured to transmit the P-type polarized light and reflect the S-type polarized light. In this way, the situation that any stray light irradiates the target position Q may be prevented, so it may be ensured that the display system has a relatively good display effect.

During specific implementation, in the above display system provided by the embodiments of the present disclosure, with reference to FIG. 2, a surface of the semi-transmitting and semi-reflecting layer T is a curved face.

Through the semi-transmitting and semi-reflecting layer T, the eyes can see an image displayed by the display panel 12 and can see an object ahead, so as to achieve augmented reality display; and the semi-transmitting and semi-reflecting layer T is set to be curved, so the viewing angle of the display system may be enlarged, thereby improving the display effect.

Implementation 3.

In the above display system provided by the embodiments of the present disclosure, as shown in FIG. 3, the light conduction component 13 includes: the semi-transmitting and semi-reflecting layer T. The semi-transmitting and semi-reflecting layer T is configured to reflect the light rays emitted by the display panel 12 to the target position Q.

Specifically, the surface of the semi-transmitting and semi-reflecting layer T may be a curved face or a flat face. When the surface of the semi-transmitting and semi-reflecting layer T is a curved face, the displayed image may be enlarged and the display viewing angle may be enlarged; and when the surface of the semi-transmitting and semi-reflecting layer T is a flat face, no enlarging effect is achieved on the displayed image, so deformation of the displayed image may be avoided, thereby guaranteeing an imaging effect of the displayed image.

The display system in the implementation 3 may be applied to a head-up display apparatus. Through the display system, overspeed alarm, vehicle condition monitoring, fuel consumption, driving speed, rear-end collision prevention, and other information may be displayed in the front of a driver, so the driver may be prevented from being distracted by watching a dash board and the drive may focus on a road ahead, thereby realizing active driving safety; and in addition, delay and uncomfortableness caused by frequent adjustments of focal length of eyes can be reduced. Specifically, by adjusting a position of the display system, an image formed by the display system may be formed 1 to 2 meters in front of a vehicle engine, so an integration degree of the formed image and a road face is relatively good.

As shown in FIG. 3, the light rays emitted by the light source module 11 irradiates the display panel 12, the light rays is reflected by the reflective layer 121 in the display panel 12 to the semi-transmitting and semi-reflecting layer T; and the semi-transmitting and semi-reflecting layer T as the light conduction component 13 may reflect the light rays to the target position Q, so the eyes at the target position Q may see the image displayed by the display panel 12 and the eyes may see the object ahead through the semi-transmitting and semi-reflecting layer T.

In practical application, a distance between the light source module 11 and the display panel 12 may be set according to an actual application scenario of the display system. When the distance between the light source module 11 and the display panel 12 is larger, the more light rays the light field may provide, and the more free the display, so the display system in the embodiments of the present disclosure is more beneficial to light field display.

During specific implementation, an integrally formed supporting structure may be adopted to support the display system in the implementation 3, so that a as to ensure that a relative positional relation among the light source module 11, the display panel 12 and the semi-transmitting and semi-reflecting layer T is relatively accurate; and a precision of the relative positional relation should be within a range of <+/−0.05 mm. If a surface of the semi-transmitting and semi-reflecting layer T is a curved face, because the semi-transmitting and semi-reflecting layer T has no enlarging effect on the displayed image, in order to ensure that both eyes can see the displayed image, a size of the display panel 12 is larger than or equal to 5 inches.

When the display system is used as a head-up display apparatus, a good observation effect may be achieved, a vergence-accommodation conflict may be eliminated, and uncomfortableness of the driver caused by raising his/her head to watch an image of the head-up display apparatus may be reduced. During specific implementation, the display system in the implementation 3 may be integrated into an automobile or other vehicle. For example, the semi-transmitting and semi-reflecting layer may be used for manufacturing a windshield, i.e. the display system is used as a front mounted type head-up display apparatus. Or the display system may be directly fixed inside the vehicle. For example, the display system may be attached to a position above the dash board, i.e. the display system may be used as a rear mounted type head-up display apparatus.

Based on the same inventive concept, the embodiments of the present disclosure further provide a display method of the above display system. Because a problem solving principle of the display method is similar to that of the above display system, for implementation of the display method, reference may be made to implementation of the above display system, and repetition will not be made here.

The display method of the display system provided by the embodiments of the present disclosure, as shown in FIG. 5, includes:

S201, according to a positional relationship among a to-be-displayed image, the light source module, the display panel and the target position as well as the original image information of the to-be-displayed image, determining the light emission information of the light sources in the light source module and the display information of the pixel units in the display panel; and S202, controlling the light sources in the light source module to emit light according to the light emission information of the light sources in the light source module, and controlling the pixel units in the display panel to display according to the display information of the pixel units in the display panel.

In the display method of the above display system provided by the embodiments of the present disclosure, an intersection point between each light ray in a light field and the light source module, and an intersection point between the each light ray and the display panel may be determined according to the positional relationship among the to-be-displayed image, the light source module, the display panel and the target position, so four-dimensional parameters corresponding to each light ray may be obtained. The light emission information of the light sources in the light source module as well as the display information of the pixel units in the display panel may be obtained in combination with the original image information of the to-be-displayed image, thereby providing a data foundation for the above display system to display an image.

Specifically, in the above display method provided by the embodiments of the present disclosure, the above step S201 may include the following steps.

With reference to FIG. 6, obtaining a plurality of image blocks 141 by differential processing the to-be-displayed image 14; and each image block 141 corresponds to one image point M at the target position. Specifically, the to-be-displayed image 14 can be differentially processed to obtain pixel-level image blocks 141; the image blocks 141 respectively form circular projections W1 and W2 at the light source module 11 and the display panel 12 in an imaging process; and the light sources and pixel units contained by the projections W1 and W2 support all light rays imaged by the corresponding image point M.

For each image block 141, determining all light rays which are from the image block 141 to the corresponding image point M, i.e. the light rays contained in the projections W1 and W2 are determined.

For each image point M, determining an intersection point between each light ray and the display panel 12 and an intersection point between the each light ray and the light source module 11, and obtaining four-dimensional coordinate values corresponding to the each light ray; and the four-dimensional coordinate values include coordinate values of the intersection point between the each light ray and the display panel and coordinate values of the intersection point between the each light ray and the light source module. Specifically, the intersection point between the light ray and the light source module 11 may be a coordinate of the position of a certain light source, and the intersection point between the light ray and the display panel 12 may be a coordinate of the position of a certain pixel unit.

The display information of the pixel units in the display panel 12 and brightness information of the light sources in the light source module 11 are determined according to the original image information of the to-be-displayed image 14 and the four-dimensional coordinate values corresponding to the image points M.

Because the original image information of the to-be-displayed image 14 records grayscale information and brightness information of the image, the light emission information of the light sources as well as the display information of the pixel units may be determined according to the original image information of the to-be-displayed image 14. Therefore, in the above step S202, the light sources are controlled to emit light according to the determined light emission information of the light sources, and the pixel units are controlled to display according to the determined display information of the pixel units, so that the to-be-displayed image is imaged at the target position.

Further, in the above display method provided by the embodiments of the present disclosure, in the above step S2021, the determining, according to the original image information of the to-be-displayed image and the four-dimensional coordinate values corresponding to the image points, the display information of the pixel units in the display panel and brightness information of the light sources in the light source module includes:

taking the four-dimensional coordinate values corresponding to the each image point as a coordinate set; and if a same four-dimensional coordinate values exist in two coordinate set, the display information and the brightness information determined based on the same four-dimensional coordinate values are abandoned.

To take any two image points (an image point 1 and an image point 2) as an example, the coordinate set of the image point 1 may be represented as $\{(s_1, t_1, u_1, v_1), (s_2, t_2, u_1, v_1), (s_1, t_3, u_2, v_3), \ldots, (s_8, t_6, u_2, v_3)\}$, and the coordinate set of the image point 2 may be represented as $\{(s_1, t_1, u_1, v_1), (s_3, t_4, u_1, v_1), (s_5, t_2, u_2, v_3), \ldots, (s_6, t_6, u_2, v_4)\}$. The first four-dimensional coordinate values in the coordinate set of the image point 1 and the coordinate set of the image point 2 are the same, which indicates that the image point 1 and the image point 2 share a light ray; if the image point 1 and the image point 2 are similar in color and grayscale, the image point 1 and the image point 2 share a light ray, which has a relatively small influence on the display effect; if the image point 1 and the image point 2 are rather different in color, color crosstalk will exit between the image point 1 and the image point 2, which will influence the display image; and therefore, in order to ensure the display effect of the display system, if the same four-dimensional coordinate values exit in the two coordinate sets, the display information and the brightness information determined based on the four-dimensional coordinate values are abandoned, i.e. the light ray that shared by the two image points is abandoned. Abandoning limited number of light rays will have no influence on the display effect, and crosstalk between the image points may be prevented.

In the display system and the display method therefor provided by the embodiments of the present disclosure, through the light source module and the reflective liquid crystal display panel, one light ray may be determined based on one light source in the light source module and one pixel unit in the display panel, and since a location of the light source in the light source module and a location of the pixel unit in the display panel have been determined, four-dimensional parameters of the light ray may be determined, so four-dimensional light field display may be realized. In addition, because one light source may support multi-image-point imaging and one pixel unit may support multi-image-point imaging, the display system can easily realize high-resolution light-field imaging.

Obviously, those of skilled in the art can make various modifications and variations to the embodiments of the present disclosure without departing from the spirit and scope of the embodiments of the present disclosure. In this way, if these modifications and variations of the present disclosure fall within the scope of the claims of the present disclosure and their equivalents, the present disclosure is also intended to cover such modifications and variations.

What is claimed is:

1. A display system based on a four-dimensional light field, comprising:

a light source module, comprising a plurality of light sources arranged in an array;

a display panel, wherein the display panel is a reflective liquid crystal display panel and comprises a plurality of pixel units arranged in an array; and a light conduction component, comprising an optical waveguiding structure, an adhesive layer, and a light extraction structure; wherein light rays emitted by the light sources in the light source module irradiate the pixel units in the display panel, and the pixel units in the display panel transmit the light rays to a target position via the light conduction component;

the optical waveguiding structure comprises: a light-emitting face, a back face opposite to the light-emitting face, and a side face; and the optical waveguiding structure is configured to achieve total reflection transmission of light rays at a set angle;

the light source module is arranged on the side face of the optical waveguiding structure; and an included angle is formed between the light source module and the optical waveguiding structure to enable the light rays emitted by the light sources to irradiate the optical waveguiding structure and to be transmitted in a total-reflection mode in the optical waveguiding structure;

the display panel is fixed to the back face of the optical waveguiding structure through the adhesive layer, a refractive index of the adhesive layer is smaller than or equal to a refractive index of the optical waveguiding structure, and the refractive index of the adhesive layer is larger than a refractive index of air; and the light extraction structure is arranged on the light-emitting face of the optical waveguiding structure and is configured to extract the light rays transmitted in the total-reflection mode in the optical waveguiding structure to the target position.

2. The display system according to claim 1 wherein the light extraction structure is a transmission grating.

3. A display method of the display system according to claim 1, comprising determining, according to a positional relationship among a to-be-displayed image, the light source module, the display panel and the target position as well as the original image information of the to-be-displayed image, light emission information of the light sources in the light source module and the display information of the pixel units in the display panel; and controlling the light sources in the light source module to emit light according to the light emission information of the light sources in the light source module; and controlling the pixel units in the display panel to display according to the display information of the pixel units in the display panel.

4. The display method according to claim 3, wherein said determining, according to the positional relationship among the to-be-displayed image, the light source module, the display panel and the target position as well as the original image information of the to-be-displayed image, the light emission information of the light sources in the light source module and the display information of the pixel units in the display panel comprises:

obtaining a plurality of image blocks by differential processing the to-be-displayed image; wherein each of the image blocks corresponds to one image point at the target position;

determining, for the each of the image blocks, all light rays which are from the each of the image blocks to a corresponding image point;

determining, for each image point, an intersection point between each light ray and the display panel, and an intersection point between the each light ray and the light source module, and obtaining four-dimensional coordinate values corresponding to the each light ray; wherein the four-dimensional coordinate values comprise coordinate values of the intersection point between the each light ray and the display panel and coordinate values of the intersection point between the each light ray and the light source module; and determining, according to the original image information of the to-be-displayed image and the four-dimensional coordinate values corresponding to the each image point, the display information of the pixel units in the display panel and brightness information of the light sources in the light source module.

5. The display method according to claim 4, wherein said determining, according to the original image information of the to-be-displayed image and the four-dimensional coordinate values corresponding to the each image point, the display information of the pixel units in the display panel and the brightness information of the light sources in the light source module comprises:

taking the four-dimensional coordinate values corresponding to the each image point as a coordinate set; and if a same four-dimensional coordinate value exist in two coordinate set, abandoning display information and brightness information determined based on the same four-dimensional coordinate value.

6. A display system based on a four-dimensional light field, comprising:

a light source module, comprising a plurality of light sources arranged in an array;

a display panel, wherein the display panel is a reflective liquid crystal display panel and comprises a plurality of pixel units arranged in an array; and a light conduction component comprising a polarizing element, a polarization reflection layer, a first quarter-wave phase retarder, a second quarter-wave phase retarder, and a semi-transmitting and semi-reflecting layer; wherein light rays emitted by the light sources in the light source module irradiate the pixel units in the display panel, and the pixel units in the display panel transmit the light rays to a target position via the light conduction component;

the light source module is arranged opposite to the display panel, the polarization reflection layer is arranged between the light source module and the display panel, an included angle is formed between the polarization reflection layer and the display panel, and the polarization reflection layer is configured to transmit first polarized light and reflect second polarized light;

the polarizing element is arranged between the light source module and the polarization reflection layer and is configured to convert the light rays emitted by the light sources into the first polarized light;

the first quarter-wave phase retarder is arranged between the display panel and the polarization reflection layer;

the semi-transmitting and semi-reflecting layer is arranged on a side of the polarization reflection layer facing away from the target position; and the second quarter-wave phase retarder is arranged between the semi-transmitting and semi-reflecting layer and the polarization reflection layer.

7. The display system according to claim 6, wherein the first polarized light is P-type polarized light, and the second polarized light is S-type polarized light;
   the polarizing element is a P-type polarizer and is configured to convert the light rays emitted by the light sources into the P-type polarized light; and
   the polarization reflection layer is configured to transmit the P-type polarized light and reflect the S-type polarized light.

8. The display system according to claim 6, wherein a surface of the semi-transmitting and semi-reflecting layer is a curved face.

9. A display method of the display system according to claim 6, comprising determining, according to a positional relationship among a to-be-displayed image, the light source module, the display panel and the target position as well as the original image information of the to-be-displayed image, light emission information of the light sources in the light source module and the display information of the pixel units in the display panel; and
   controlling the light sources in the light source module to emit light according to the light emission information of the light sources in the light source module; and
   controlling the pixel units in the display panel to display according to the display information of the pixel units in the display panel.

10. The display method according to claim 9, wherein said determining, according to the positional relationship among the to-be-displayed image, the light source module, the display panel and the target position as well as the original image information of the to-be-displayed image, the light emission information of the light sources in the light source module and the display information of the pixel units in the display panel comprises:
    obtaining a plurality of image blocks by differential processing the to-be-displayed image; wherein each of the image blocks corresponds to one image point at the target position;
    determining, for the each of the image blocks, all light rays which are from the each of the image blocks to a corresponding image point;
    determining, for each image point, an intersection point between each light ray and the display panel, and an intersection point between the each light ray and the light source module, and obtaining four-dimensional coordinate values corresponding to the each light ray; wherein the four-dimensional coordinate values comprise coordinate values of the intersection point between the each light ray and the display panel and coordinate values of the intersection point between the each light ray and the light source module; and
    determining, according to the original image information of the to-be-displayed image and the four-dimensional coordinate values corresponding to the each image point, the display information of the pixel units in the display panel and brightness information of the light sources in the light source module.

11. The display method according to claim 10, wherein said determining, according to the original image information of the to-be-displayed image and the four-dimensional coordinate values corresponding to the each image point, the display information of the pixel units in the display panel and the brightness information of the light sources in the light source module comprises:
    taking the four-dimensional coordinate values corresponding to the each image point as a coordinate set; and
    if a same four-dimensional coordinate value exist in two coordinate set, abandoning display information and brightness information determined based on the same four-dimensional coordinate value.

* * * * *